(12) United States Patent
Sasase

(10) Patent No.: US 9,906,657 B2
(45) Date of Patent: Feb. 27, 2018

(54) TERMINAL APPARATUS TO OPERATE AN IMAGE PROCESSING APPARATUS, AND IMAGE PROCESSING CONTROL SYSTEM

(71) Applicant: Konica Minolta, Inc., Chiyoda-ku, Tokyo (JP)

(72) Inventor: Naoko Sasase, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/076,956

(22) Filed: Mar. 22, 2016

(65) Prior Publication Data

US 2016/0286056 A1   Sep. 29, 2016

(30) Foreign Application Priority Data

Mar. 27, 2015   (JP) .................................. 2015-066170

(51) Int. Cl.
G06F 3/12 (2006.01)
H04N 1/00 (2006.01)
H04N 1/327 (2006.01)

(52) U.S. Cl.
CPC ..... H04N 1/00103 (2013.01); H04N 1/00278 (2013.01); H04N 1/00307 (2013.01); H04N 1/32765 (2013.01); H04N 1/32786 (2013.01); H04N 2201/0013 (2013.01); H04N 2201/0055 (2013.01); H04N 2201/0072 (2013.01); H04N 2201/0094 (2013.01)

(58) Field of Classification Search
None
See application file for complete search history.

(56) References Cited

U.S. PATENT DOCUMENTS

| 2011/0026068 A1* | 2/2011 | Yoshida | H04N 1/00347 358/1.14 |
| 2013/0027746 A1* | 1/2013 | Sasase | H04N 1/00209 358/1.15 |
| 2014/0104635 A1* | 4/2014 | Nishikawa | H04N 1/00238 358/1.14 |

FOREIGN PATENT DOCUMENTS

| JP | 2011120144 A | 6/2011 |
| JP | 2013246785 A | 12/2013 |
| JP | 2014085904 A | 5/2014 |

OTHER PUBLICATIONS

Notice of Grounds of Rejection corresponding to JP Application No. 2015-066170; dated May 9, 2017.

* cited by examiner

Primary Examiner — Miya J Williams
(74) Attorney, Agent, or Firm — Cantor Colburn LLP

(57) ABSTRACT

A terminal apparatus can communicate by radio with an MFP in a defined range among a plurality of MFPs. When an MFP of which radio communication intensity is higher than a threshold value defined in advance is detected among the plurality of MFPs, the terminal apparatus quits radio communication before it accepts an operation to indicate connection of radio communication from a user. When such a user operation is accepted, the terminal apparatus establishes radio communication with an MFP of which radio communication intensity is highest at the time when the user operation is performed.

5 Claims, 13 Drawing Sheets

FIG.6

DO YOU OPERATE THIS MFP ?

YES    NO

TERMINAL APPARATUS TO OPERATE AN IMAGE PROCESSING APPARATUS, AND IMAGE PROCESSING CONTROL SYSTEM

This application is based on Japanese Patent Application No. 2015-066170 filed with the Japan Patent Office on Mar. 27, 2015, the entire content of which is hereby incorporated by reference.

BACKGROUND OF THE INVENTION

Field of the Invention

This disclosure relates to a terminal apparatus, a control system, and a non-transitory computer-readable storage medium storing a control program, and particularly to a terminal apparatus communicating by radio with a controlled apparatus, a control system including a terminal apparatus and a controlled apparatus, and a non-transitory computer-readable storage medium storing a program for controlling a terminal apparatus.

Description of the Related Art

For example, an apparatus capable of radio communication with a terminal apparatus, such as a multi-functional peripheral (MFP), may remotely be operated with the terminal apparatus.

For radio communication between a terminal apparatus and a controlled apparatus, in order to allow a remote operation, a communication scheme allowing communication over a certain distance is adopted. This radio scheme includes, for example, near field radio communication called Bluetooth® or near field radio communication at extremely low power called Bluetooth low energy (BLE), which represents one of expanded specifications of Bluetooth.

In starting a remote operation, a terminal apparatus detects one apparatus highest in communication intensity as a controlled apparatus and establishes communication with that apparatus. Thus, a user of the terminal apparatus can remotely operate the apparatus with the terminal apparatus, by coming close to the apparatus.

When a plurality of MFPs which may be a controlled apparatus are arranged in proximity, a terminal apparatus may detect an MFP unintended by a user and connect to that MFP.

In order to address such a problem, Japanese Laid-Open Patent Publication No. 2011-120144 discloses a technique for determining on a side of image formation apparatuses which may be a controlled apparatus, priority among a plurality of image formation apparatuses which have received an inquiry about communication information from a terminal apparatus, and sending back the priority to the terminal apparatus together with the communication information.

In making use of this technique, however, a dedicated application should be installed in apparatuses which may be a controlled apparatus, such as an MFP. Since an apparatus which may be a controlled apparatus determines priority based on an inquiry from a terminal apparatus in a certain period, the apparatus may not be able to respond in real time to the inquiry from the terminal apparatus.

SUMMARY OF THE INVENTION

An object in one aspect of the present disclosure is to provide a terminal apparatus with which a user can smoothly remotely operate through radio communication, an image processing apparatus which is a controlled apparatus.

According to one embodiment, a terminal apparatus can remotely operate an image processing apparatus through radio communication. The terminal apparatus includes a communication device and a hardware processor. The hardware processor is configured to detect whether or not there is an image processing apparatus of which radio communication intensity is higher than a threshold value defined in advance, temporarily establish communication with a detected image processing apparatus through first radio communication, obtain communication information necessary for second radio communication different from the first radio communication with the detected image processing apparatus, quit radio communication through the first radio communication after the communication information is obtained, give a user a notification about a remote operation on the detected image processing apparatus, and establish radio communication through the second radio communication with an image processing apparatus highest in intensity in first radio communication based on the obtained communication information when a user operation to indicate connection through second radio communication in response to the notification is accepted.

According to another aspect, a terminal apparatus can remotely operate an image processing apparatus through radio communication. The terminal apparatus includes a communication device and a hardware processor. The hardware processor is configured to detect whether or not there is an image processing apparatus of which radio communication intensity is higher than a threshold value defined in advance, temporarily establish communication with a detected image processing apparatus through first radio communication, obtain communication information necessary for second radio communication different from the first radio communication with the detected image processing apparatus, quit radio communication through the first radio communication after the communication information is obtained, give a user a notification about a remote operation on the detected image processing apparatus, present at least one detected image processing apparatus in a selectable manner when a user operation to indicate connection through second radio communication in response to the notification is accepted, and establish radio communication through second radio communication with a selected image processing apparatus based on the obtained communication information when a user operation to select an image processing apparatus with which the second radio communication is to be carried out from among the presented image processing apparatuses is accepted.

According to another embodiment, a control system includes an image processing apparatus and a terminal apparatus which can remotely operate the image processing apparatus through radio communication. The terminal apparatus includes a communication device and a hardware processor. The hardware processor is configured to detect whether or not there is an image processing apparatus of which radio communication intensity is higher than a threshold value defined in advance, temporarily establish communication with a detected image processing apparatus through first radio communication, obtain communication information necessary for second radio communication different from the first radio communication with the detected image processing apparatus, quit radio communication through the first radio communication after the communication information is obtained, give a user a notification about a remote operation on the detected image processing apparatus, and establish radio communication through second radio communication with an image processing apparatus highest in intensity in first radio communication based on the obtained communication information when a user operation to indicate connection through second radio communication in response to the notification is accepted.

According to another embodiment, a control system includes an image processing apparatus and a terminal apparatus which can remotely operate the image processing apparatus through radio communication. The terminal apparatus includes a communication device and a hardware processor. The hardware processor is configured to detect whether or not there is an image processing apparatus of which radio communication intensity is higher than a threshold value defined in advance, temporarily establish communication with a detected image processing apparatus through first radio communication, obtain communication information necessary for second radio communication different from the first radio communication with the detected image processing apparatus, quit radio communication through the first radio communication after the communication information is obtained, give a user a notification about a remote operation on the detected image processing apparatus, present in a selectable manner, at least one image processing apparatus detected by a detection unit when a user operation to indicate connection through the second radio communication in response to the notification is accepted, and establish radio communication through second radio communication with a selected image processing apparatus based on the obtained communication information when a user operation to select an image processing apparatus with which the second radio communication is to be carried out from among the image processing apparatuses presented by a presentation unit is accepted.

According to another embodiment, a non-transitory computer-readable storage medium storing a control program for causing the hardware processor to perform each processing by the hardware processor is provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing a screen example of the terminal apparatus.

DESCRIPTION OF THE PREFERRED EMBODIMENTS

Figure 1:
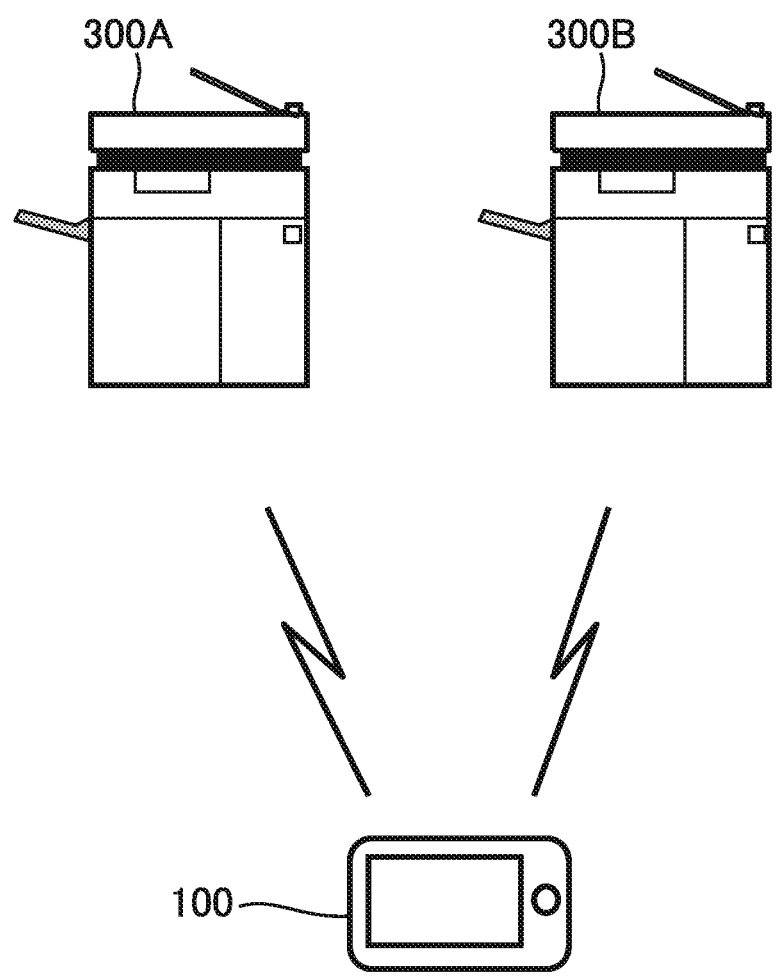
FIG. 1 is a diagram showing one example of a configuration of a control system (hereinafter abbreviated as a system) according to an embodiment.

An embodiment of the present invention will be described hereinafter with reference to the drawings. In the description below, the same elements and components have the same reference characters allotted. Their label and function are also identical. Therefore, description thereof will not be repeated.

First Embodiment

<System Configuration>

FIG. 1 is a diagram showing one example of a configuration of a control system (hereinafter abbreviated as a system) according to the present embodiment. Referring to FIG. 1, the present system includes a terminal apparatus 100 representing one example of a control apparatus and multi-functional peripherals (MFPs) 300A and 300B representing one example of a controlled apparatus. The present system includes a plurality of MFPs 300A and 300B as controlled apparatuses. A plurality of MFPs 300A and 300B are representatively also referred to as an MFP 300.

Terminal apparatus 100 has a size, a shape, and a weight allowing a user to carry the terminal apparatus. Terminal apparatus 100 may be implemented, for example, by a smartphone, a compact personal computer (PC), or a portable telephone.

Terminal apparatus 100 and MFP 300 can communicate by radio with each other. Radio communication is exemplified by communication in conformity with specifications called Bluetooth®, Bluetooth low energy (BLE) representing one of the expanded specifications thereof, or wireless fidelity (Wifi). Preferably, terminal apparatus 100 and MFP 300 carry out radio communication of two types of BLE and Wifi.

<Apparatus Configuration>

Figure 2:
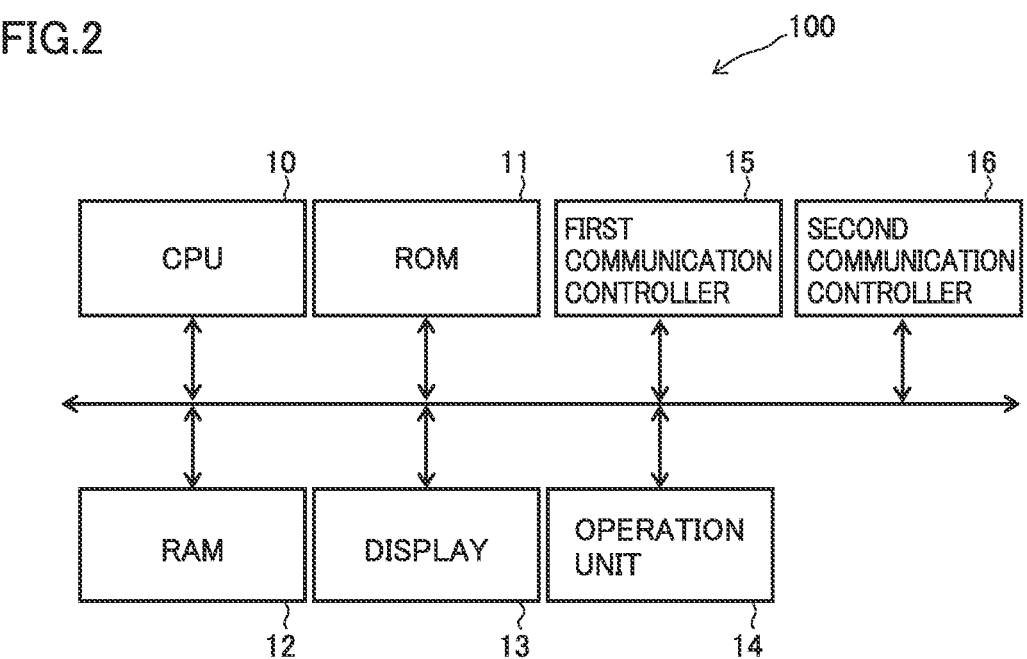
FIG. 2 is a block diagram showing one example of an apparatus configuration of a terminal apparatus included in the system.

FIG. 2 is a block diagram showing one example of an apparatus configuration of terminal apparatus 100. Referring to FIG. 2, terminal apparatus 100 includes a central processing unit (CPU) 10 for overall control of an apparatus, a read only memory (ROM) 11 for storing a program executed by CPU 10, and a random access memory (RAM) 12 storing various types of data or serving as a work area in execution of a program by CPU 10. CPU 10 includes a display 13, an operation unit 14, a first communication controller 15, and a second communication controller 16. First communication controller 15 controls BLE radio communication between terminal apparatus 100 and MFP 300. Second communication controller 16 controls Wifi radio communication between terminal apparatus 100 and MFP 300.

MFP 300 may have a configuration of a general MFP. A CPU (not shown) of MFP 300 includes a first communication controller (not shown) for controlling BLE radio communication with terminal apparatus 100 and a second communication controller (not shown) for controlling Wifi radio communication with terminal apparatus 100.

<Operation Overview>

In the present system, a user of terminal apparatus 100 remotely operates MFP 300 with terminal apparatus 100. A method of remotely operating MFP 300 with terminal apparatus 100 is not limited to a specific method. By way of example, terminal apparatus 100 obtains information for displaying an operation screen from MFP 300, displays the operation screen of MFP 300, and transmits to MFP 300, information indicating a position of an operation by a user onto the operation screen. MFP 300 specifies contents of the user operation based on the information and performs processing indicated by the user operation. Such a remote operation method is also called remote panel.

In order to perform the remote operation as above, terminal apparatus 100 establishes radio communication with MFP 300 for transmitting and receiving information necessary for the remote operation, such as information showing the operation screen or a position of an operation. Prior to radio communication for the remote operation, terminal apparatus 100 obtains from MFP 300, communication information necessary for establishing radio communication. The communication information includes access information for accessing MFP 300 through radio communication for the remote operation. When radio communication for the remote operation is Wifi radio communication, the access information includes a media access control (Mac) address.

MFP 300 broadcasts to a range covered by radio communication (first radio communication) for obtaining communication information, access information as the communication information necessary for establishing radio communication (second radio communication) for the remote operation with MFP 300. For example, BLE radio communication is defined as first radio communication. For example, Wifi radio communication is defined as second radio communication.

When terminal apparatus 100 is present within coverage by first radio communication from MFP 300, terminal apparatus 100 obtains communication information from MFP 300. When terminal apparatus 100 performs the remote operation on MFP 300, terminal apparatus 100 establishes with MFP 300, communication (second radio communication) for the remote operation by using the communication information obtained from MFP 300.

Figure 3:
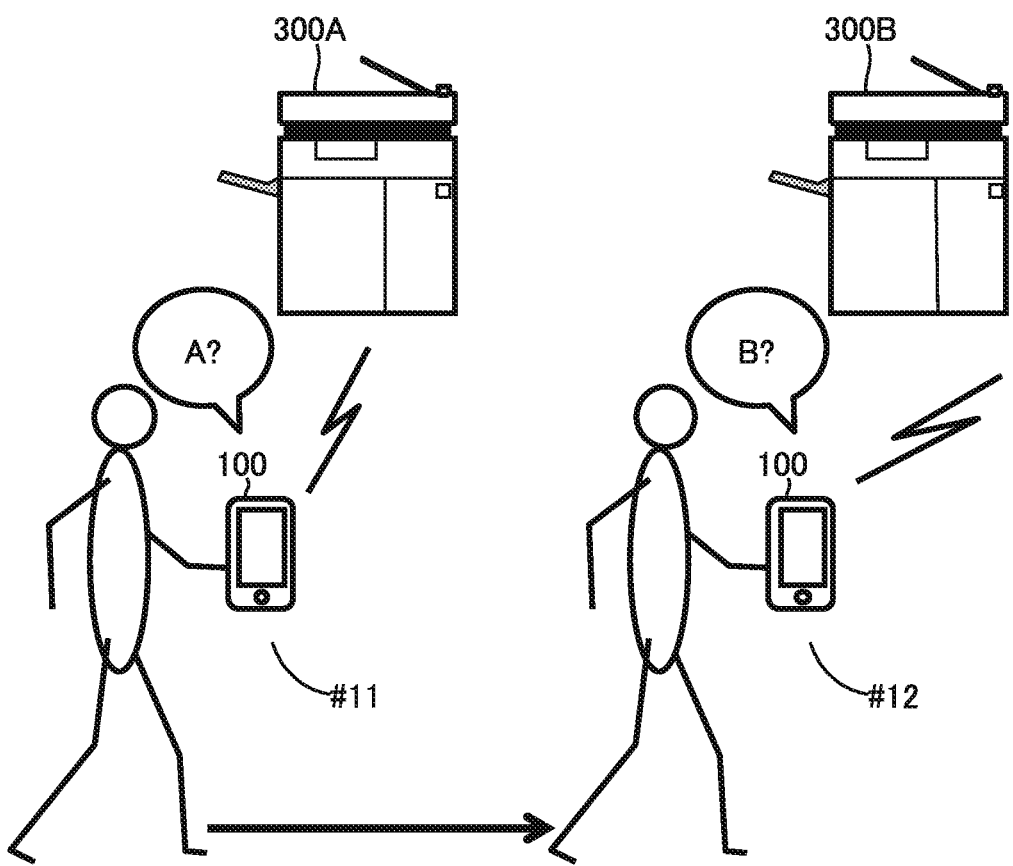
FIGS. 3 and 4 are diagrams for illustrating movement of a user of a terminal apparatus and a notification on the terminal apparatus according to a first embodiment when a plurality of multi-functional peripherals (MFPs) are arranged in proximity.
Figure 4:
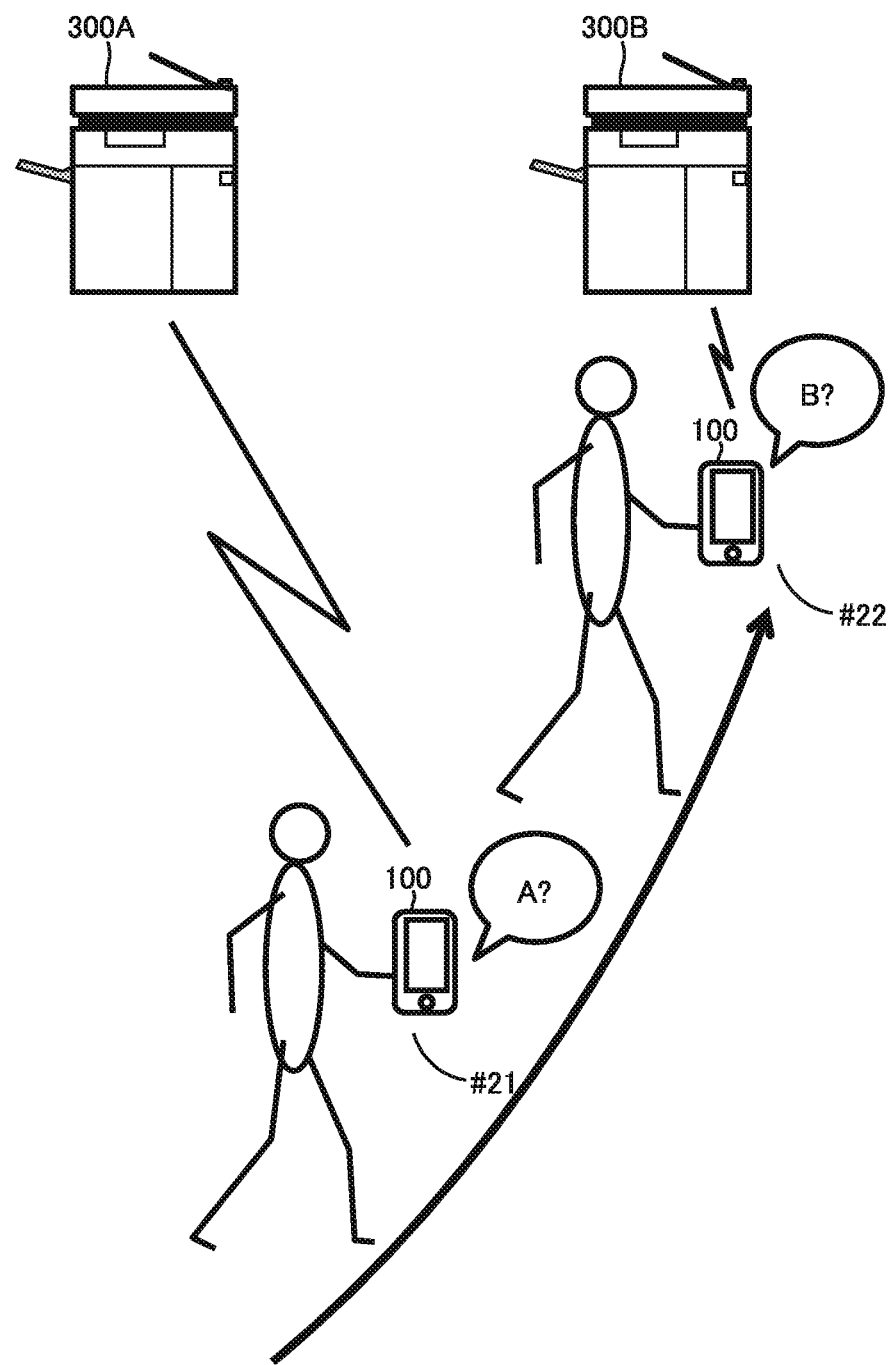

FIGS. 3 and 4 are diagrams for illustrating movement of a user of terminal apparatus 100 and a notification on the terminal apparatus according to the first embodiment when MFP 300A and MFP 300B are arranged in proximity to each other.

A user of terminal apparatus 100 may temporarily come close to MFP 300A in coming close to MFP 300B. For example, as shown in FIG. 3, the user of terminal apparatus 100 may pass by MFP 300A and walk to MFP 300B. When terminal apparatus 100 reaches the range covered by first radio communication with MFP 300A, a screen notifying that there is MFP 300 which can remotely be operated is displayed on terminal apparatus 100 (step #11). Then, when terminal apparatus 100 reaches the range covered by first radio communication with MFP 300B, a screen notifying that there is MFP 300 which can remotely be operated is displayed on terminal apparatus 100 (step #12).

For example, as shown in FIG. 4, the user of terminal apparatus 100 may walk across in front of MFP 300A in coming close to MFP 300B. Here again, when terminal apparatus 100 reaches the range covered by first radio communication with MFP 300A, a screen notifying that there is MFP 300 which can remotely be operated is displayed on terminal apparatus 100 (step #21). Then, when terminal apparatus 100 reaches the range covered by first radio communication with MFP 300B, a screen notifying that there is MFP 300 which can remotely be operated is displayed on terminal apparatus 100 (step #22).

Figure 5:
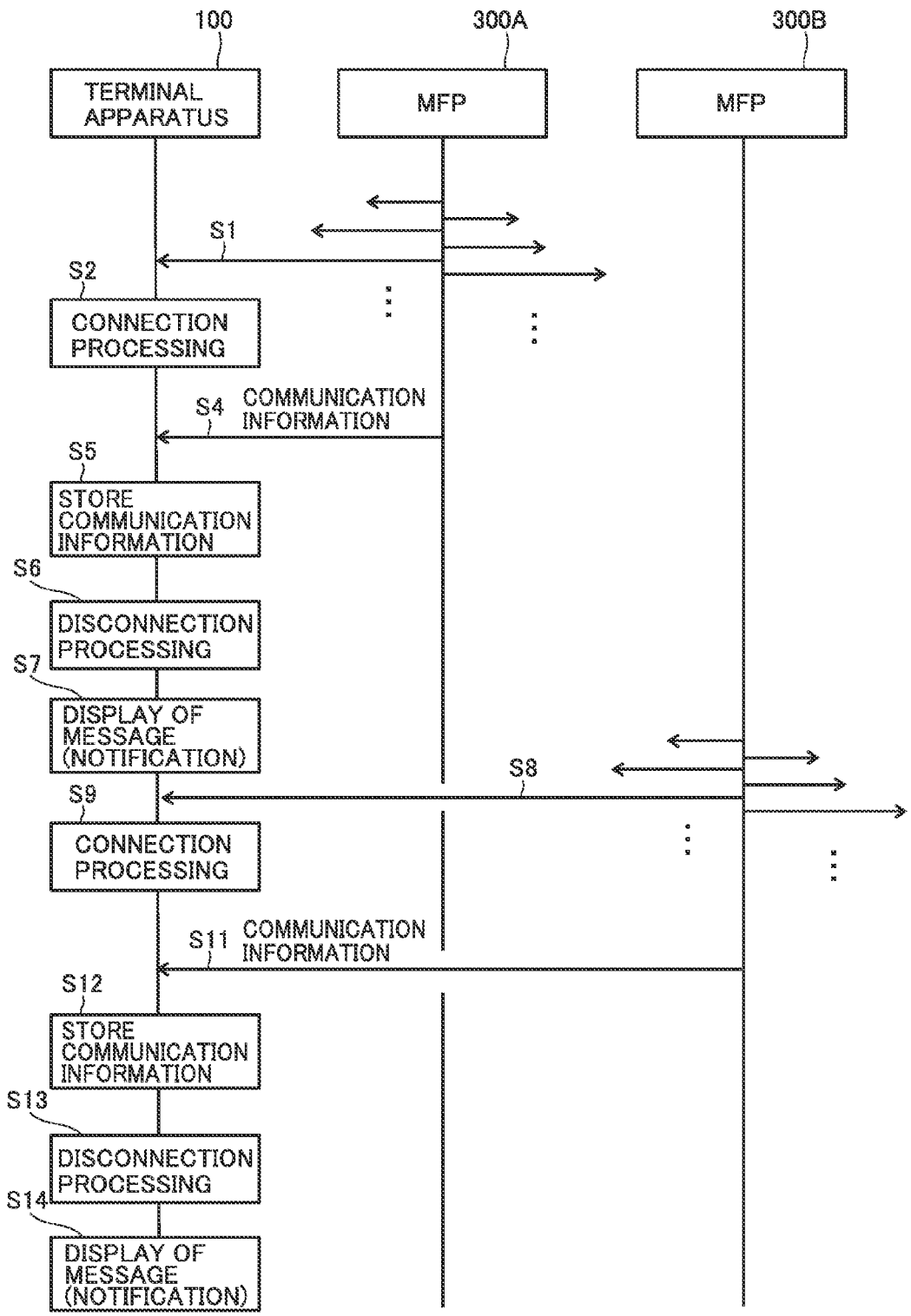
FIG. 5 is a diagram showing a flow of operations in the system when the user of the terminal apparatus acts as shown in FIG. 3 or 4.

FIG. 5 is a diagram showing a flow of operations in the present system when the user of terminal apparatus 100 acts as shown in FIG. 3 or 4.

Referring to FIG. 5, MFP 300 broadcasts access information as communication information necessary for establishing Wifi radio communication (second radio communication) representing one example of communication for a remote operation, through BLE radio communication (first radio communication) representing one example of radio communication for obtaining communication information (steps S1 and S8).

Terminal apparatus 100 monitors intensity of BLE radio communication with MFPs 300A and 300B. When it is detected that intensity in BLE radio communication with MFP 300A is higher than a threshold value defined in advance, processing for connecting BLE radio communication with MFP 300A is performed (step S2). Then, terminal apparatus 100 receives the broadcast from MFP 300A and obtains communication information of MFP 300A (step S4). When terminal apparatus 100 obtains the communication information of MFP 300A, it has a memory such as RAM 12 store the communication information (step S5).

When terminal apparatus 100 obtains the communication information of MFP 300A, it disconnects BLE radio communication with MFP 300A (step S6). Thus, when relation of intensity in BLE radio communication between terminal apparatus 100 and MFP 300 changes, terminal apparatus 100 can immediately be in a state that it can carry out BLE radio communication with a different MFP 300 in response to the change.

Figure 6:
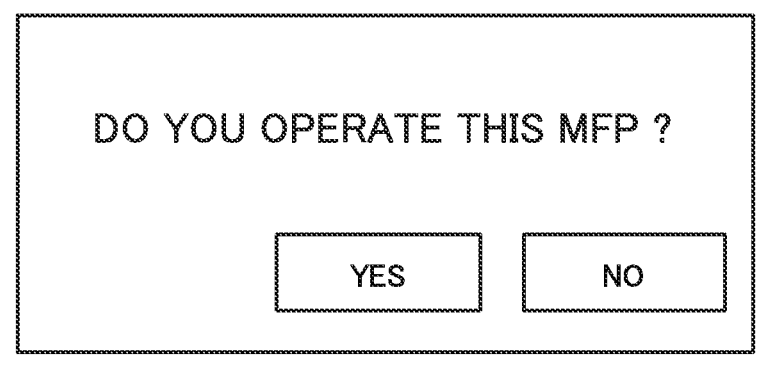

When it is detected that intensity in BLE radio communication with MFP 300A is higher than the threshold value defined in advance, terminal apparatus 100 gives a notification that there is a controlled apparatus with which Wifi radio communication can be carried out (step S7). In step S7, terminal apparatus 100 displays on display 13, a message showing that there is MFP 300 which can remotely be operated through Wifi radio communication on a screen in FIG. 6 by way of example. FIG. 6 shows a screen notifying MFP 300 intended by the user of start of radio communication for the remote operation at the time point indicated by the user. In another example, terminal apparatus 100 may also give a notification about processing to be performed by MFP 300 intended by the user, such as "do you make authentication with this MFP?" or "do you print on this MFP?"

Then, when it is detected that intensity in BLE radio communication with MFP 300B is higher than the threshold value defined in advance, terminal apparatus 100 performs processing for connecting BLE radio communication with MFP 300B (step S9). Then, terminal apparatus 100 receives the broadcast from MFP 300B and obtains the communication information of MFP 300B (step S11). When terminal apparatus 100 obtains the communication information of MFP 300B, it has a memory such as RAM 12 store the communication information (step S12).

When terminal apparatus 100 obtains the communication information of MFP 300B, it disconnects BLE radio communication with MFP 300B (step S13).

When it is detected that intensity in BLE radio communication with MFP 300B is higher than the threshold value defined in advance, terminal apparatus 100 gives a notification that there is a controlled apparatus with which Wifi radio communication can be carried out (step S14). In step S14 as well, terminal apparatus 100 displays the screen as in step S6 (FIG. 6) on display 13.

Figure 7:
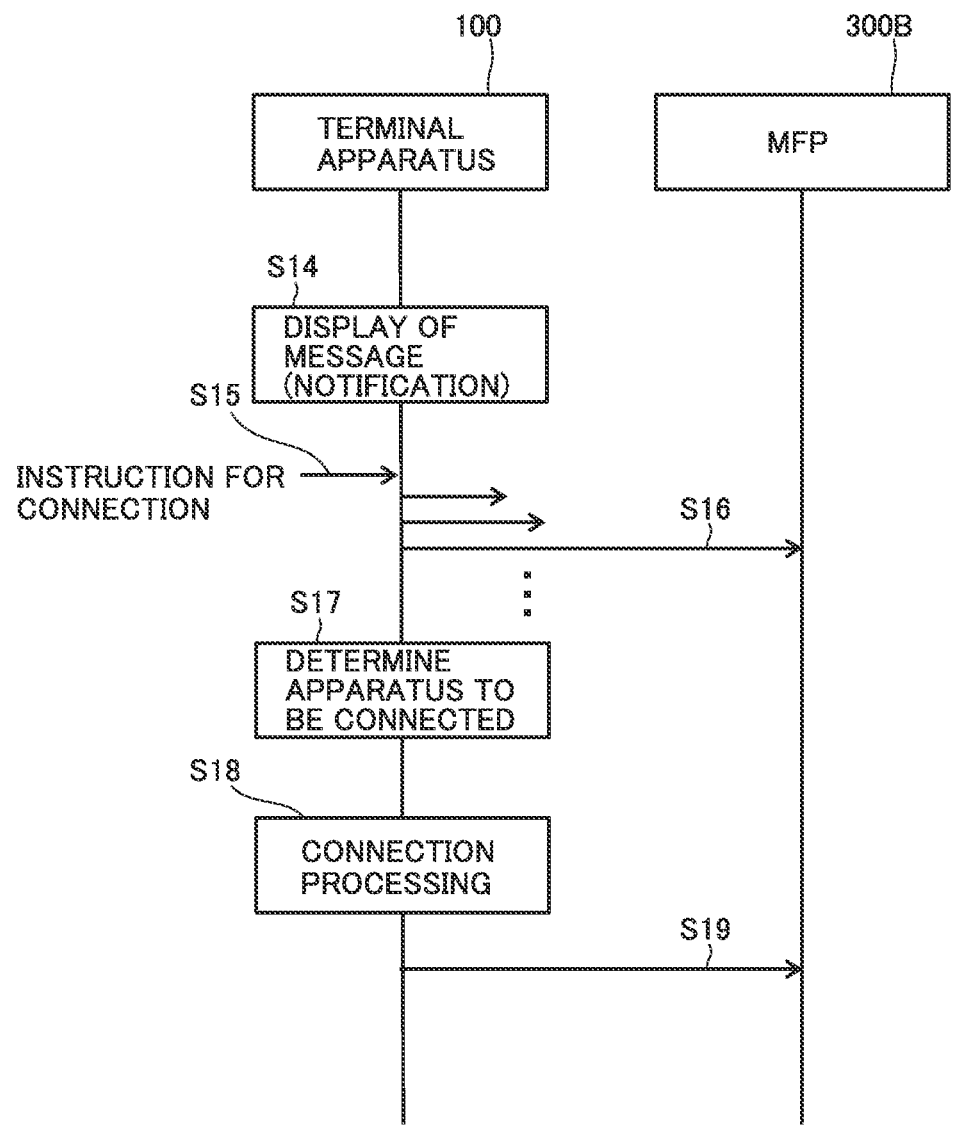
FIG. 7 is a diagram showing a flow of operations in the system when the user of the terminal apparatus performs an operation to start a remote operation.

FIG. 7 is a diagram showing a flow of operations in the system when the user of terminal apparatus 100 performs an operation to start a remote operation.

Referring to FIG. 7, when terminal apparatus 100 is instructed by the user to connect to MFP 300 through radio communication for the remote operation (step S15) while the screen in FIG. 6 is displayed on display 13 of terminal apparatus 100 (step S14), terminal apparatus 100 measures radio communication intensity with each MFP 300 within coverage by radio communication (step S16) and determines MFP 300 highest in radio communication intensity at the time point of issuance of the instruction as MFP 300 to be connected through Wifi radio communication representing the second radio communication (step S17). Then, terminal apparatus 100 performs processing for connection through Wifi radio communication onto MFP 300 determined in step S17 (step S18) and starts Wifi radio communication with MFP 300 (step S19).

<Functional Configuration>

Figure 8:
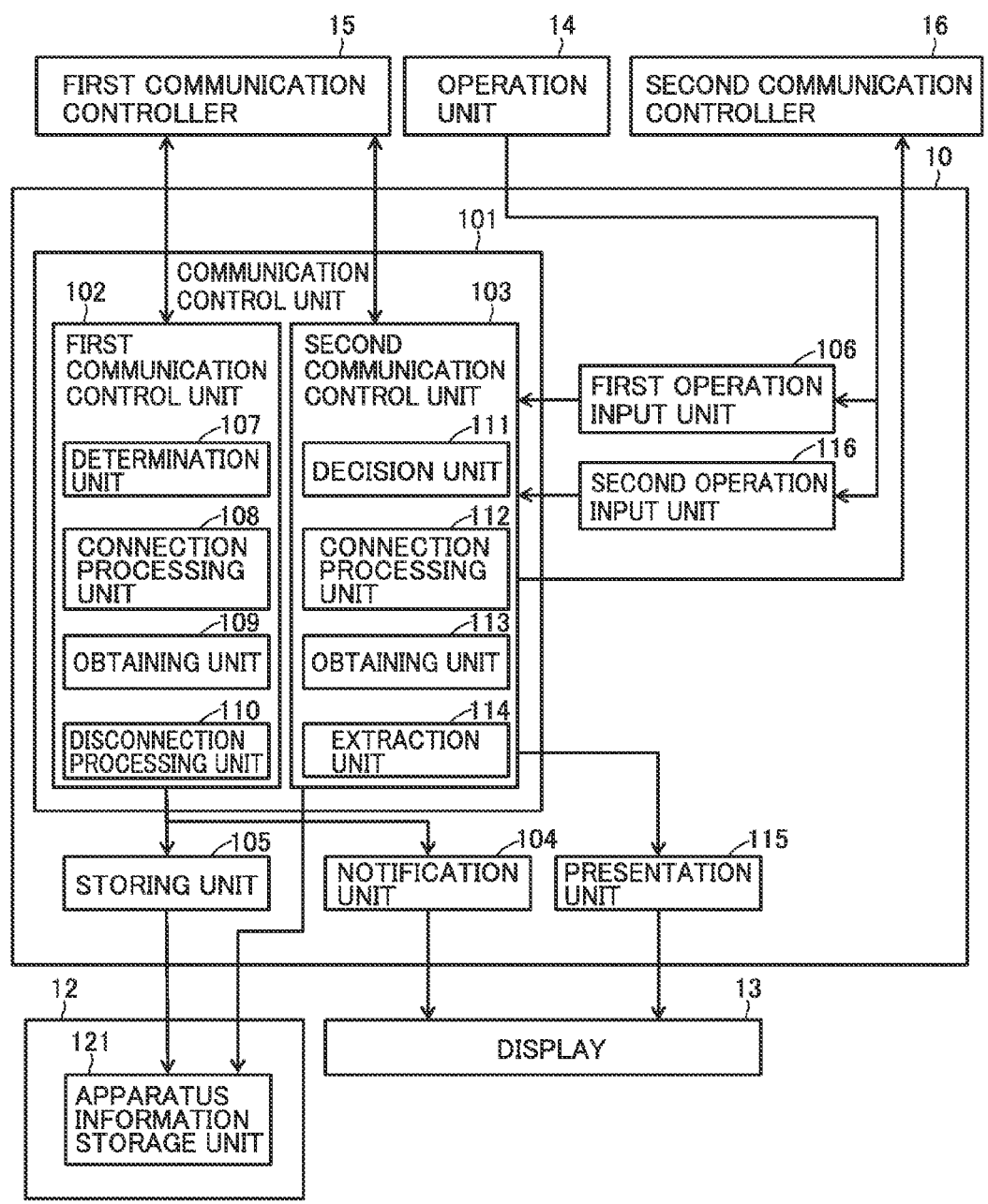
FIG. 8 is a block diagram showing one example of a functional configuration of the terminal apparatus.

FIG. 8 is a block diagram showing one example of a functional configuration of terminal apparatus 100 for performing the operations above. Each function in FIG. 8 is mainly implemented by CPU 10 as CPU 10 of terminal apparatus 100 reads a program stored in ROM 11 on RAM 12 and executes the program. At least some functions, however, may be implemented by other hardware shown in FIG. 2 or other hardware such as a not-shown electric circuit.

Referring to FIG. 8, CPU 10 of terminal apparatus 100 includes a communication control unit 101 for controlling communication with MFP 300, a first operation input unit 106, a notification unit 104, and a storing unit 105.

Notification unit 104 gives a notification that there is MFP 300 which can be connected by radio when radio communication intensity with MFP 300 is higher than a threshold value defined in advance. Notification unit 104 performs processing for displaying a screen showing, for example, the message in FIG. 6 on display 13.

First operation input unit 106 accepts a user operation to indicate connection of radio communication.

Communication control unit 101 has radio communication with MFP 300 quit after detection of radio communication intensity being higher than the threshold value and by the time when at least first operation input unit 106 accepts the user operation above. Then, communication control unit 101 allows connection of radio communication with MFP 300 highest in radio communication intensity among MFPs 300 within coverage by radio communication at the time when the user operation is performed, in accordance with the user operation.

Preferably, communication control unit 101 includes a first communication control unit 102 and a second communication control unit 103. First communication control unit 102 includes a determination unit 107, a connection processing unit 108, an obtaining unit 109, and a disconnection processing unit 110. Second communication control unit 103 includes a decision unit 111 and a connection processing unit 112.

Determination unit 107 determines whether or not radio communication intensity is higher than the threshold value by comparing intensity in BLE radio communication representing first radio communication with MFP 300 with the threshold value.

Connection processing unit 108 performs processing for connecting BLE radio communication with MFP 300 when radio communication intensity is higher than the threshold value.

Obtaining unit 109 obtains from MFP 300, communication information for carrying out Wifi radio communication representing communication for a remote operation (second radio communication), by carrying out BLE radio communication with MFP 300.

Disconnection processing unit 110 performs processing for quitting BLE radio communication with MFP 300 when obtainment of communication information from MFP 300 is completed.

Storing unit 105 has an apparatus information storage unit 121 in RAM 12 store the communication information of MFP 300 obtained by obtaining unit 109 from MFP 300.

Decision unit 111 determines MFP 300 highest in intensity in BLE radio communication at the time of acceptance of the user operation to indicate connection of radio communication among MFPs 300 within coverage by radio communication, as MFP 300 with which Wifi radio communication for the remote operation is to be carried out.

Connection processing unit 112 reads the communication information stored in apparatus information storage unit 121 and performs processing for connecting Wifi radio communication with determined MFP 300.

Preferably, second communication control unit 103 further includes an obtaining unit 113. Obtaining unit 113 obtains communication information by carrying out BLE radio communication with MFP 300 when communication information of MFP 300 highest in radio communication intensity among MFPs 300 within coverage by radio communication at the time when the user operation to indicate connection of radio communication is accepted has not been obtained. A case that the communication information of MFP 300 has not been obtained is exemplified by a case that MFP 300 highest in radio communication intensity is different from the MFP of which communication information has been obtained by obtaining unit 113.

<Operation Flow>

Figure 9:
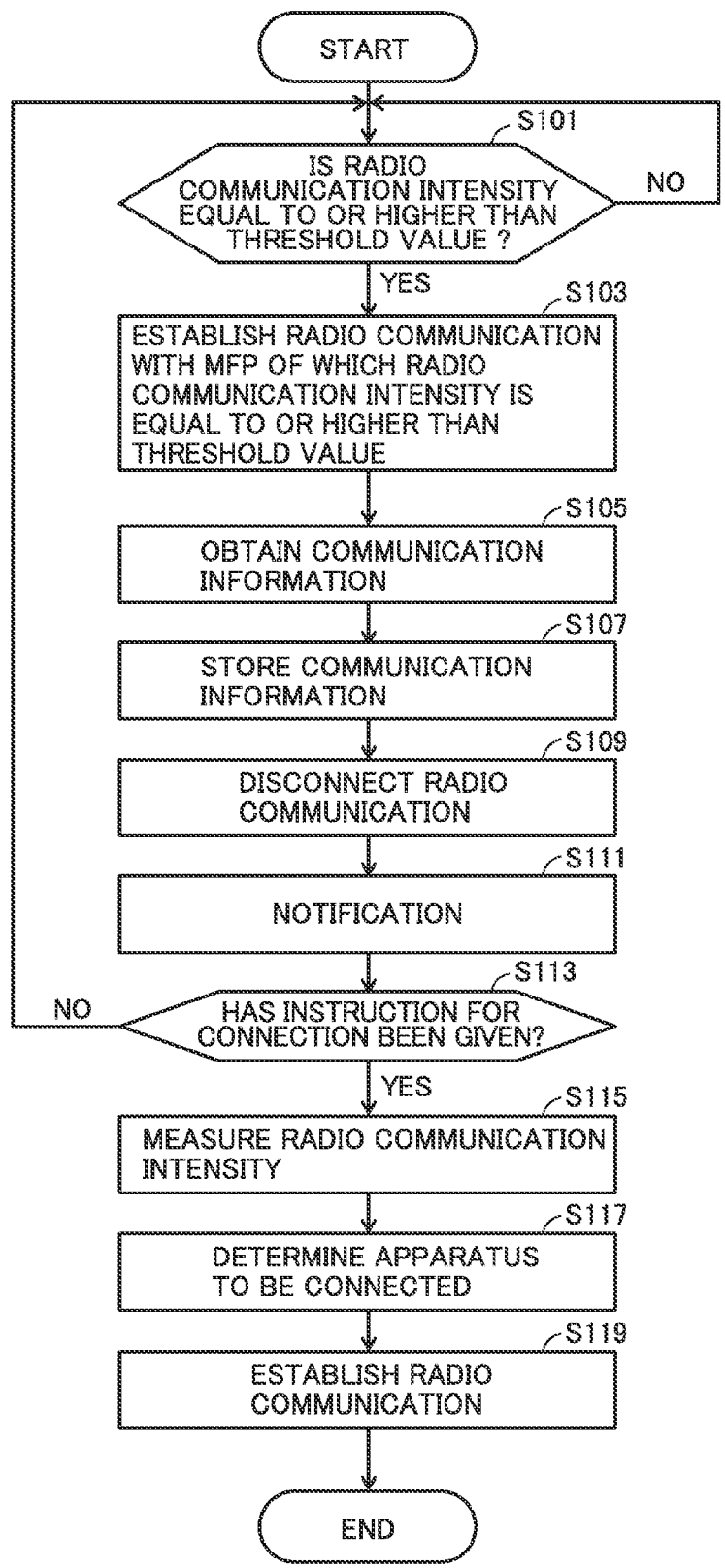
FIG. 9 is a flowchart showing one example of a flow of operations in the terminal apparatus according to the first embodiment.

FIG. 9 is a flowchart showing one example of a flow of operations in terminal apparatus 100 according to the first embodiment. Operations in the flowchart in FIG. 9 are implemented as CPU 10 of terminal apparatus 100 reads a program stored in ROM 11 on RAM 12 and executes the program to thereby exhibit each function in FIG. 8.

Referring to FIG. 9, when CPU 10 of terminal apparatus 100 detects MFP 300 of which intensity in BLE radio communication is higher than the threshold value defined in advance (YES in step S101), it has BLE radio communication established with MFP 300 (step S103). Then, CPU 10 obtains communication information for Wifi radio communication from MFP 300 through BLE radio communication (step S105). CPU 10 has, for example, RAM 12 store the communication information obtained in step S105 (step S107). Thereafter, CPU 10 disconnects BLE radio communication with MFP 300 at least before acceptance of the user operation to indicate start of connection (step S109).

When CPU 10 detects MFP 300 of which intensity in BLE radio communication is higher than the threshold value defined in advance, it has display 13 display, for example, the screen in FIG. 6 and notifies that there is MFP 300 with which radio communication can be carried out (step S111). CPU 10 may perform the operation in step S111 before the operations in steps S103 to S109.

When a user operation to indicate connection is performed during the notification in step S111 (YES in step S113), CPU 10 measures intensity in BLE radio communication of each MFP 300 (step S115) and determines MFP 300 highest in radio communication intensity as MFP 300 to be connected through radio communication for a remote operation (step S117). Then, CPU 10 performs processing for establishing Wifi radio communication with MFP 300 determined in step S117 (step S119).

When the communication information of MFP 300 determined in step S117 is not stored in RAM 12, CPU 10 obtains communication information by carrying out BLE radio communication with MFP 300 before it establishes communication in step S119.

When a user operation to indicate connection is not performed during the notification (NO in step S113), CPU 10 repeats the operation from step S101. Namely, CPU 10 again specifies MFP 300 of which intensity in BLE radio communication is equal to or higher than the threshold value, and notifies that there is such MFP 300 by having the screen in FIG. 6 displayed on the display.

Effect in First Embodiment

As the operations above are performed in the system according to the first embodiment, even when the user of terminal apparatus 100 comes close to MFP 300B as shown in FIGS. 3 and 4 and it has been detected that radio communication with MFP 300A can be carried out before it is detected that radio communication with MFP 300B can be carried out, MFP 300B closest to terminal apparatus 100 can be set an MFP to be connected as the user indicates connection of Wifi radio communication in the vicinity of MFP 300B. In the present system, the remote operation of MFP 300 by making use of radio communication can thus smoothly be performed.

Second Embodiment

Since a configuration of a system and an apparatus configuration of terminal apparatus 100 according to a second embodiment are the same as the configuration of the system (FIG. 1) and the apparatus configuration of terminal apparatus 100 (FIG. 2) according to the first embodiment, description thereof will not be repeated.

<Operation Overview>

Figure 10:
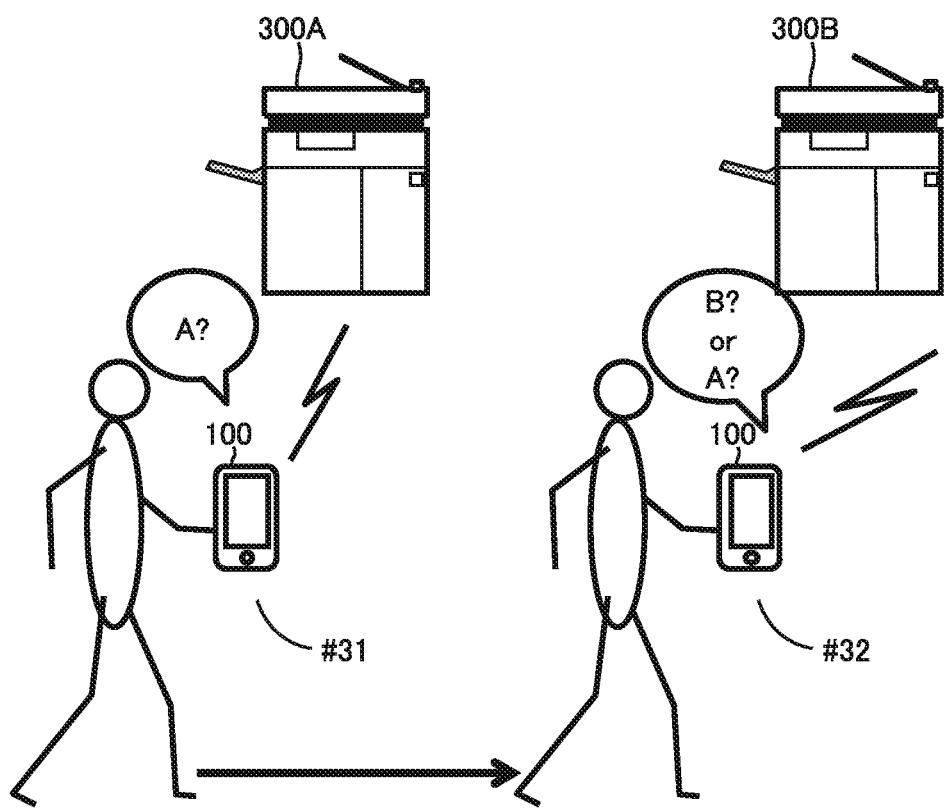
FIG. 10 is a diagram for illustrating movement of the user of the terminal apparatus and a notification on the terminal apparatus according to a second embodiment when a plurality of MFPs are arranged in proximity.

FIG. 10 is a diagram for illustrating movement of the user of terminal apparatus 100 and a notification on terminal apparatus 100 according to the second embodiment when MFP 300A and MFP 300B are arranged in proximity to each other.

For example, as shown in FIG. 10, the user of terminal apparatus 100 may pass by MFP 300A and walk to MFP 300B. When terminal apparatus 100 reaches a range covered by first radio communication with MFP 300A, a screen notifying that there is MFP 300 which can remotely be operated is displayed on terminal apparatus 100. A screen displayed here is, for example, a screen displaying such a message as "do you start remote operation of MFP?" When the user gives an instruction for connection while this screen is displayed, the fact that MFP 300A is available as a controlled apparatus which can remotely be operated is displayed on terminal apparatus 100 (step #31).

Then, when terminal apparatus 100 reaches a range covered by first radio communication with MFP 300B, a screen as above which notifies that there is MFP 300 which can remotely be operated is displayed on terminal apparatus 100. When the user gives an instruction for connection while this screen is displayed, the fact that MFP 300B and MFP 300A are available as a controlled apparatus which can remotely be operated is displayed on terminal apparatus 100 (step #32).

Figure 11:
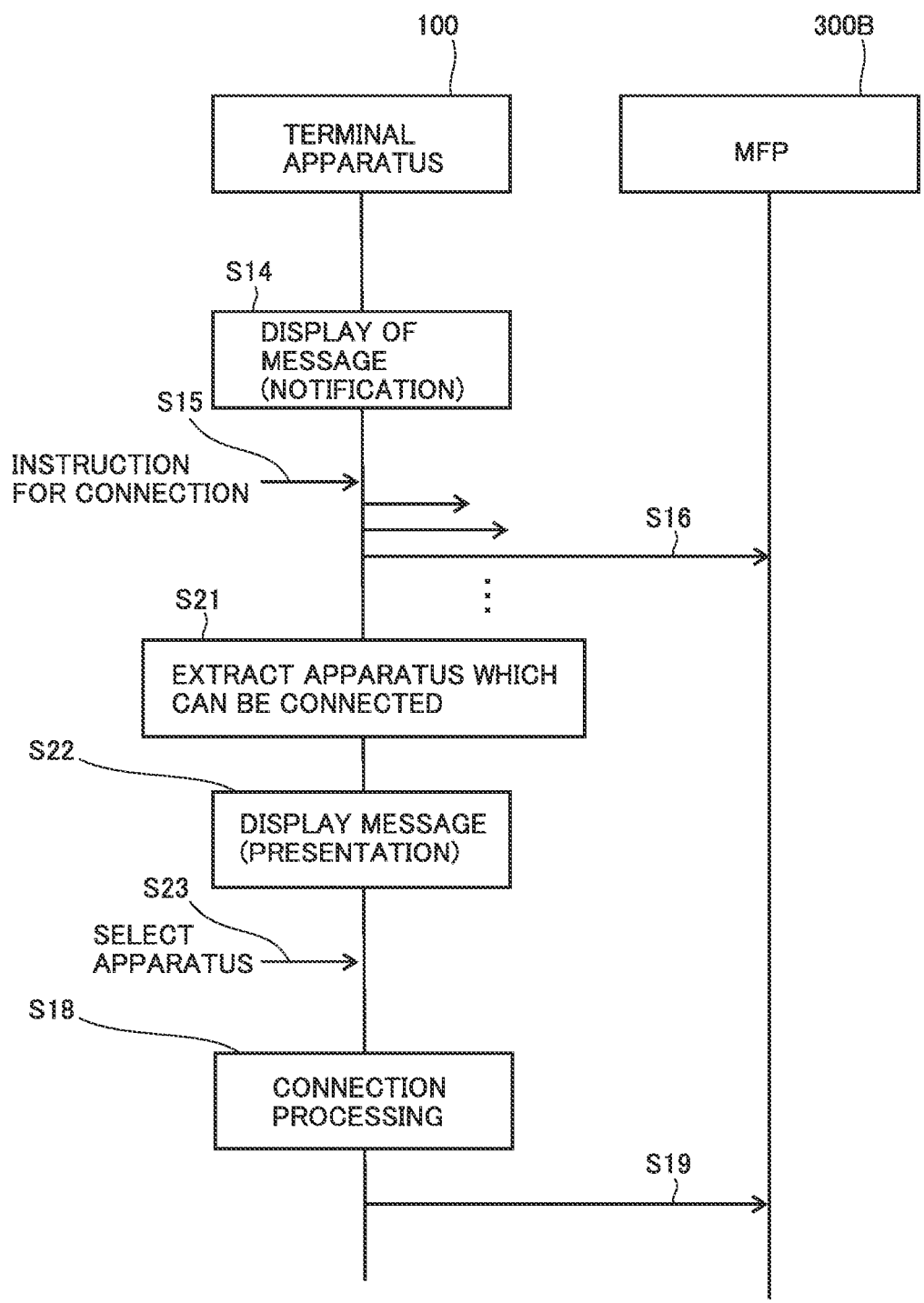
FIG. 11 is a diagram showing a flow of operations in the system when the user of the terminal apparatus acts as shown in FIG. 10.

FIG. 11 is a diagram showing a flow of operations in the present system when the user of terminal apparatus 100 acts as shown in FIG. 10 and after the screen notifying that there is MFP 300 which can remotely be operated is displayed on terminal apparatus 100. Operations shown in FIG. 11 correspond to the operations in the system according to the first embodiment shown in FIG. 7. The flow of operations until the screen notifying that there is MFP 300 which can remotely be operated is displayed on terminal apparatus 100 is the same as the operations in the system according to the first embodiment shown in FIG. 5.

Figure 12A:
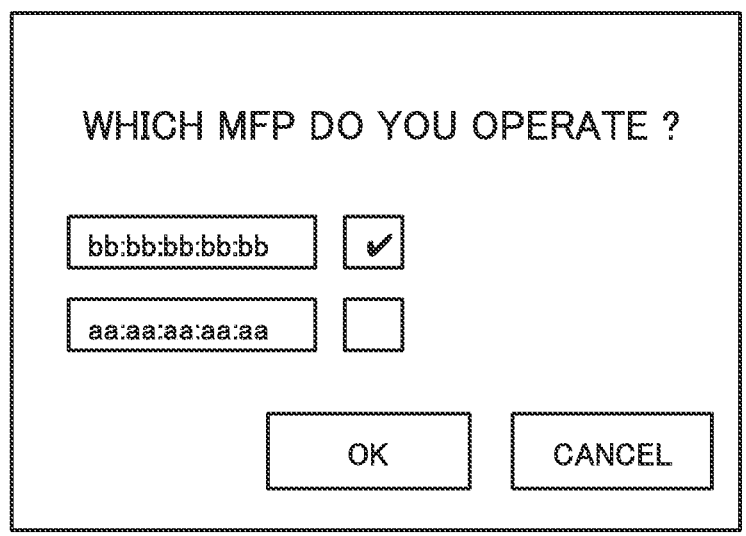
FIGS. 12A and 12B are diagrams showing screen examples of the terminal apparatus.

Referring to FIG. 11, when terminal apparatus 100 is instructed by the user to connect to MFP 300 through radio communication for the remote operation (step S15) while the screen in FIG. 6 is displayed on display 13 of terminal apparatus 100 (step S14), terminal apparatus 100 measures intensity in radio communication with each MFP 300 within coverage by radio communication (step S16). Then, MFP 300 of which radio communication intensity is higher than the threshold value defined in advance among MFPs 300 is extracted as a candidate for MFP 300 to be connected through Wifi radio communication representing second radio communication (step S21). Terminal apparatus 100 presents extracted MFP 300 as the candidate for MFP 300 to be connected through Wifi radio communication (step S22) and accepts selection. In step S22, terminal apparatus 100 presents access information which is communication information of each MFP 300 extracted in step S21 on the screen in FIG. 12A by way of example and displays a selection screen for accepting selection therefrom on display 13.

Figure 12B:
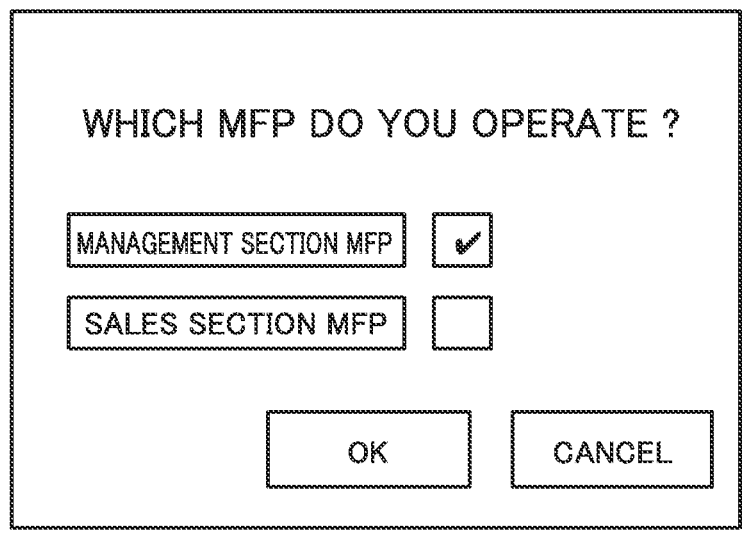

Preferably, MFP 300 broadcasts information allowing identification of an apparatus as apparatus information, together with communication information, in step S1 or S8. Alternatively, when terminal apparatus 100 obtains communication information from MFP 300, it may further request of MFP 300 for further apparatus information. Information allowing identification of an apparatus includes an apparatus name set for MFP 300 by a specific user such as an administrator or a product name registered in advance in MFP 300. In this case, in step S22, terminal apparatus 100 presents the apparatus name or the product name representing the apparatus information of each MFP 300 extracted in step S21 on a screen in FIG. 12B by way of example and displays a selection screen for accepting selection therefrom on display 13.

Preferably, in presenting extracted MFP 300 in step S22, terminal apparatus 100 presents these MFPs 300 in the order based on radio communication intensity of extracted MFPs 300. For example, terminal apparatus 100 presents MFPs 300 in the descending order of radio communication intensity. Thus, MFPs 300 are presented in the order from MFP 300 closer to terminal apparatus 100. In contrast, terminal apparatus 100 may present MFPs 300 in the ascending order of radio communication intensity. Then, MFPs 300 are more likely to be presented in the order of obtainment of communication information in terminal apparatus 100.

When terminal apparatus 100 accepts selection of MFP 300 to be connected in the selection screen displayed in step S22 (step S23), it performs processing for connection through Wifi radio communication with selected MFP 300 (step S18) and starts Wifi radio communication with MFP 300 (step S19).

<Functional Configuration>

A functional configuration of terminal apparatus 100 for performing the operations above will further be described with reference to FIG. 8. Referring to FIG. 8, in terminal apparatus 100 according to the second embodiment, second communication control unit 103 further includes an extraction unit 114. Extraction unit 114 extracts MFP 300 of which radio communication intensity is higher than the threshold value defined in advance among MFPs 300 within coverage by radio communication at the time when first operation input unit 106 accepts a user operation to indicate connection of radio communication, as a candidate for MFP 300 to be connected through Wifi radio communication.

CPU 10 further includes a presentation unit 115 and a second operation input unit 116. Presentation unit 115 presents MFP 300 extracted by extraction unit 114. Presentation unit 115 performs, for example, processing for displaying the selection screen in FIG. 12A on display 13.

Preferably, obtaining unit 109 obtains also apparatus information together with communication information from MFP 300. In this case, presentation unit 115 performs, for example, processing for displaying the selection screen in FIG. 12B on display 13.

Preferably, presentation unit 115 determines the order of presentation based on radio communication intensity of each extracted MFP 300. For example, presentation unit 115 presents extracted MFPs 300 in the descending order of radio communication intensity.

Second operation input unit 116 accepts a user operation to select an apparatus with which radio communication is to be carried out from among MFPs 300 presented by presentation unit 115. Connection processing unit 112 reads communication information stored in apparatus information storage unit 121 and performs processing for connection of Wifi radio communication with selected MFP 300.

<Operation Flow>

Figure 13:
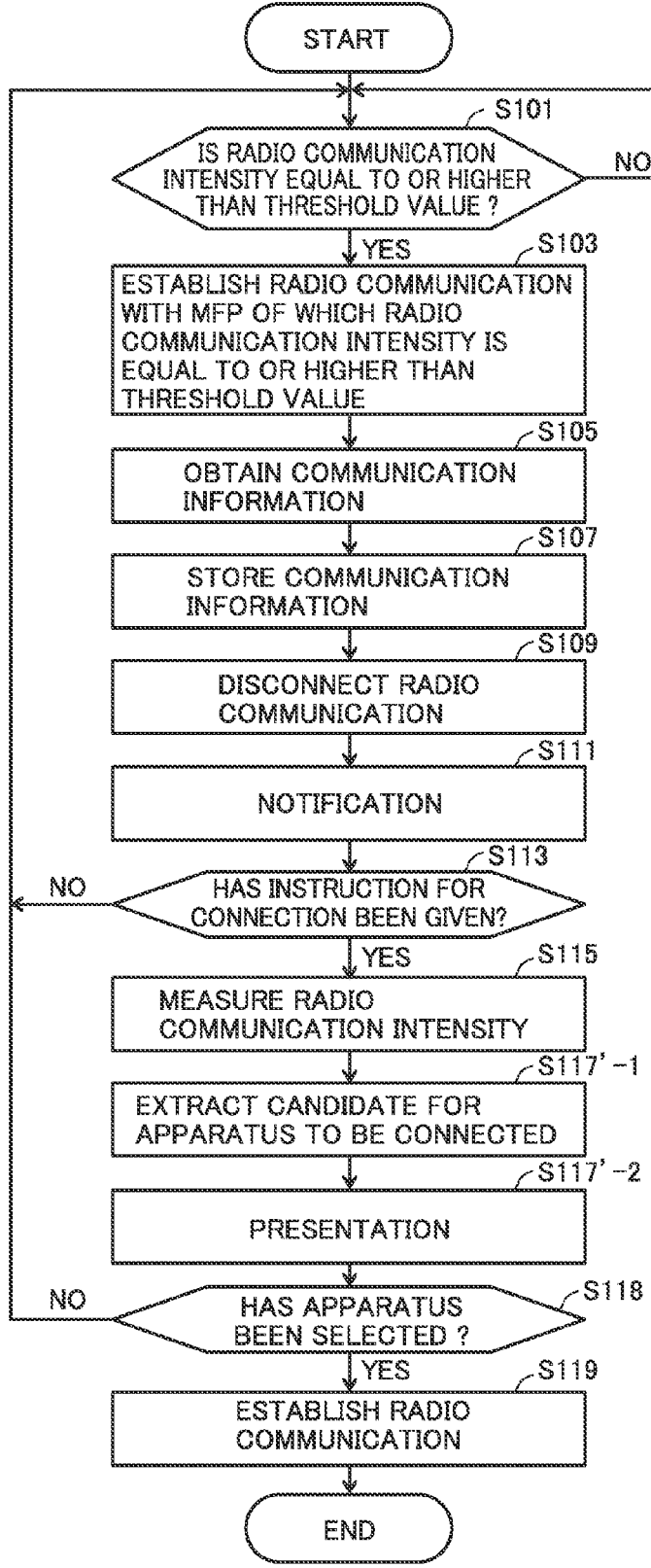
FIG. 13 is a flowchart showing one example of a flow of operations in the terminal apparatus according to the second embodiment.

FIG. 13 is a flowchart showing one example of a flow of operations in terminal apparatus 100 according to the second embodiment. Operations in the flowchart in FIG. 13 are also implemented as CPU 10 of terminal apparatus 100 reads a program stored in ROM 11 on RAM 12 and executes the program to thereby exhibit each function in FIG. 8.

Referring to FIG. 13, CPU 10 of terminal apparatus 100 according to the second embodiment performs operations the same as in steps S101 to S111 in terminal apparatus 100 according to the first embodiment shown in FIG. 9.

When a user operation to indicate connection is performed during notification in step S111 (YES in step S113), CPU 10 of terminal apparatus 100 according to the second embodiment measures intensity in BLE radio communication with each MFP 300 (step S115). CPU 10 extracts MFP 300 of which intensity in BLE radio communication is higher than the threshold value defined in advance among MFPs 300, as a candidate for MFP 300 to be connected through Wifi radio communication representing second radio communication (step S117'-1). Then, CPU 10 presents extracted MFP 300 as the candidate for MFP 300 to be connected through Wifi radio communication (step S117'-2). Preferably, in step S117'-2, CPU 10 determines the order of presentation based on radio communication intensity, for example, as the descending order of radio communication intensity, and presents MFPs 300 in the determined order of presentation.

When selection of MFP 300 to be connected through Wifi radio communication from among the presented candidates is accepted (YES in step S118), CPU 10 performs processing for establishing Wifi radio communication with selected MFP 300 (step S119).

When a user operation to indicate connection is not performed during notification in step S111 (NO in step S113) or when a user operation to select MFP 300 to be connected through Wifi radio communication is not performed during presentation in step S117'-2 (NO in step S118), CPU 10 repeats the operation from step S101.

Effect of Embodiments

As the operations according to the first embodiment are performed in the present system, Wifi radio communication with MFP 300 highest in radio communication intensity at the timing of issuance of an instruction for connection of Wifi radio communication for a user of terminal apparatus 100 to perform a remote operation with terminal apparatus 100 is started.

As the operations according to the second embodiment are performed in the present system, MFP 300 of which radio communication intensity is equal to or higher than the threshold value at the timing of issuance of an instruction for connection of Wifi radio communication for a user of terminal apparatus 100 to perform a remote operation with terminal apparatus 100 is presented as a candidate for MFP 300 to remotely be operated. Then, Wifi radio communication with MFP 300 selected by the user among the candidates is started.

In the present system, when a user of terminal apparatus 100 comes close to MFP 300A and then to MFP 300B, radio communication with MFP 300A is once disconnected after MFP 300A is detected by terminal apparatus 100. Therefore, radio communication with MFP 300B is immediately enabled and MFP 300B is detected by terminal apparatus 100. Therefore, even when a user first comes close to MFP 300A which is not intended by the user as shown in FIGS. 3, 4, and 10 while the user intends to perform a remote operation with terminal apparatus 100 by coming close to MFP 300B, in the present system, at the timing of issuance of an instruction for start of the remote operation from the user, MFP 300A is detected as a candidate for an apparatus to remotely be operated. Thus, in the present system, the remote operation of MFP 300 by making use of radio communication can smoothly be performed. Namely, in the present system, the user of terminal apparatus 100 can smoothly perform the remote operation of MFP 300 which is a controlled apparatus, by making use of radio communication.

Another Example 1

In the description above, terminal apparatus 100 and MFP 300 communicate with each other under two different communication schemes of first communication for obtaining communication information (BLE radio communication) and second communication for a remote operation (Wifi radio communication). Such a communication method, however, is by way of example, and the communication method in the present system is not limited to this method. Namely, without carrying out communication in two stages under the different communication schemes, terminal apparatus 100 may communicate in one stage, in which communication information necessary for radio communication for a remote operation is obtained from MFP 300 with which radio communication can be carried out and further radio communication is carried out. The same communication scheme may be used for communication in the two stages.

Another Example 2

Furthermore, a program for having processing described above performed by CPU 10 of terminal apparatus 100 can also be provided. By providing such a program, an existing terminal apparatus such as a smartphone or a compact PC can operate as terminal apparatus 100 described above. Therefore, the system can readily be constructed with the use of existing terminal apparatuses.

Such a program can also be recorded on a computer-readable recording medium such as a flexible disk, a CD-ROM (Compact Disk-Read Only Memory), a ROM (Read Only Memory), a RAM (Random Access Memory), and a memory card adapted to a computer, and can be provided as a program product. Alternatively, the program can also be recorded and provided in a recording medium such as a hard disk contained in the computer. Further, the program can also be provided by downloading through a network.

The program according to the present disclosure may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present disclosure.

Alternatively, the program according to the present disclosure may be provided in a manner incorporated as a part of another program. In such a case as well, the program itself does not include the module included in another program, but the program executes the processing in cooperation with another program. Such a program incorporated in another program may also be encompassed in the program according to the present disclosure.

The provided program product is installed in a program storage unit such as a hard disk for execution. The program product includes the program itself and the recording medium recording the program.

Though the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A terminal apparatus which can remotely operate an image processing apparatus through radio communication, comprising:
   a communication device; and
   a hardware processor configured to
      detect whether there is an image processing apparatus of which radio communication intensity is higher than a threshold value defined in advance,
      temporarily establish communication with a detected image processing apparatus through first radio communication,
      obtain communication information necessary for second radio communication different from the first radio communication with the detected image processing apparatus,
      quit radio communication through the first radio communication after the communication information is obtained,
      give a user a notification about a remote operation on the detected image processing apparatus,
      present at least one detected image processing apparatus in a selectable manner when a user operation to indicate connection through the second radio communication in response to the notification is accepted, and
      establish radio communication through the second radio communication with a selected image processing apparatus based on the obtained communication information when a user operation to select an image processing apparatus with which the second radio communication is to be carried out from among presented image processing apparatuses is accepted;
   wherein when the image processing apparatus of which radio communication intensity is higher than the threshold value at time when the user operation to select an image processing apparatus with which the second radio communication is to be carried out is accepted is different from the detected image processing apparatus, the hardware processor is configured to obtain communication information necessary for the second radio communication with the different image processing apparatus by carrying out the first radio communication with the different image processing apparatus.

2. The terminal apparatus according to claim 1, wherein the hardware processor is configured to present information based on the communication information of the at least one detected image processing apparatus in a selectable manner.

3. The terminal apparatus according to claim 1, wherein the hardware processor is configured to obtain from the image processing apparatus, information which can specify an image processing apparatus of which radio communication intensity is higher than the threshold value, together with the communication information, and to present information based on the information which can specify the image processing apparatus of the at least one detected image processing apparatus in a selectable manner.

4. A non-transitory computer-readable storage medium storing a control program for causing the hardware processor to perform each act by the hardware processor according to claim 1.

5. A control system, comprising:
   an image processing apparatus; and
   a terminal apparatus which can remotely operate the image processing apparatus through radio communication,
   the terminal apparatus including
      a communication device, and
      a hardware processor configured to
         detect whether there is an image processing apparatus of which radio communication intensity is higher than a threshold value defined in advance,
         temporarily establish communication with a detected image processing apparatus through first radio communication, obtain communication information necessary for second radio communication different from the first radio communication with the detected image processing apparatus, quit radio communication through the first radio communication after the communication information is obtained, give a user a notification about a remote operation on the detected image processing apparatus, present at least one detected image processing apparatus in a selectable manner when a user operation to indicate connection through the second radio communication in response to the notification is accepted, and establish radio communication through the second radio communication with a selected image processing apparatus based on the obtained communication information when a user operation to select an image processing apparatus with which the second radio communication is to be carried out from among presented image processing apparatuses is accepted;

wherein when the image processing apparatus of which radio communication intensity is higher than the threshold value at time when the user operation to select an image processing apparatus with which the second radio communication is to be carried out is accepted is different from the detected image processing apparatus, the hardware processor is configured to obtain communication information necessary for the second radio communication with the different image processing apparatus by carrying out the first radio communication with the different image processing apparatus.

* * * * *